United States Patent [19]
Tajima et al.

[11] 3,944,324
[45] Mar. 16, 1976

[54] IMAGE STABILIZED ZOOM LENS SYSTEM

[75] Inventors: Akira Tajima, Kawasaki; Ryusho Hirose, Machida; Kazuya Hosoe, Machida; Hiroshi Furukawa, Tokyo; Toshikazu Ichiyanagi, Tokyo, all of Japan

[73] Assignee: Canon Kabushiki Kaisha, Tokyo, Japan

[22] Filed: Nov. 8, 1974

[21] Appl. No.: 522,288

[30] Foreign Application Priority Data
Nov. 15, 1973  Japan.............................. 48-128981

[52] U.S. Cl. ................................................. 350/16
[51] Int. Cl.² .......................................... G02B 23/00
[58] Field of Search ........................................ 350/16

[56] References Cited
UNITED STATES PATENTS
3,468,596  9/1969  Alvarez.............................. 350/16

*Primary Examiner*—R. V. Rolinec
*Assistant Examiner*—Darwin R. Hostetter
*Attorney, Agent, or Firm*—Toren, McGeady and Stanger

[57] ABSTRACT

A zoom lens system comprising an afocal front lens assembly and an image forming rear lens assembly is provided with stabilized optical means arranged in the optical path between said front and rear lens assemblies. When zooming, the stabilized optical means is controlled in accordance with the variation of angular magnification of the front lens assembly and with the deviation of the housing incorporating the zoom lens system from an original line of sight. The image is thus stabilized at the focal plane thereof against such deviation by varying the deflecting angle of the exiting light axis from the stabilized optical means with respect to the entering light axis. In one embodiment of the present invention, the rear lens assembly includes one or more members movable for zooming in such a manner that the zooming operation of the front lens assembly is consecutively followed by the zooming operation of the rear lens assembly, or vice versa. The stabilized optical means is preferably constructed in the form of a variable optical wedge, or a combination of a swingable mirror and a fixed mirror.

7 Claims, 4 Drawing Figures

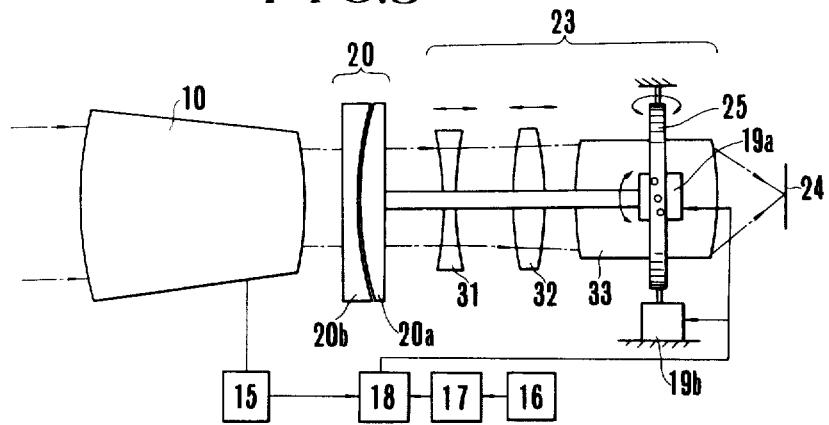
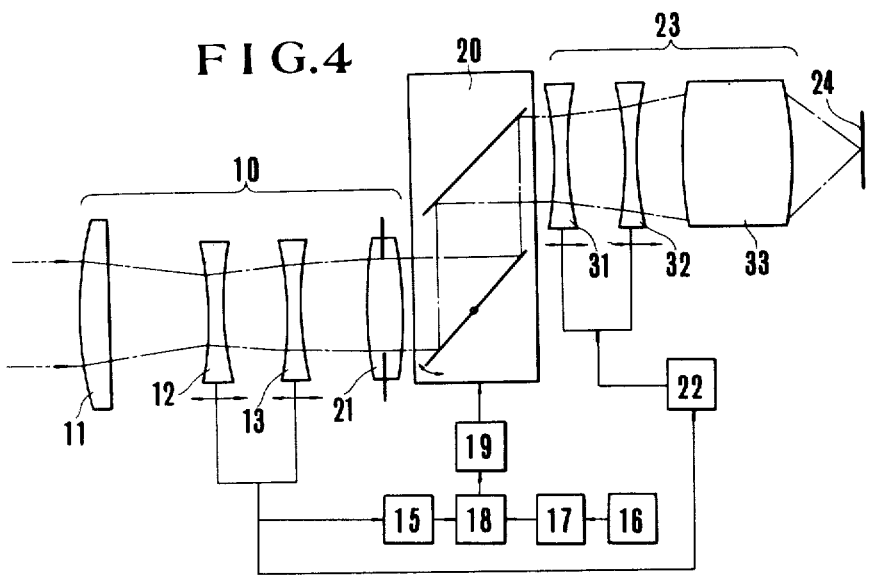

IMAGE STABILIZED ZOOM LENS SYSTEM

BACKGROUND OF THE INVENTION

This invention relates to zoom lens systems with stabilized optical means, and more particularly to an image stabilizing mechanism for a camera, telescope, or other optical instrument employing a zoom lens objective.

When pictures are taken by a hand held movie camera, or when a cine camera of the hand held type, or a telescope is used, while walking, or riding in a car, the camera or telescope is subjected to both severe car vibrations and the normal jiggle introduced by the user. This results in an undesirable image at the focal plane of the camera, or an unpleasant view field in the telescope.

There have previously been developed various image stabilization systems. The present applicant also has proposed such a system in U.S. Pat. application Ser. No. 442,605. A system employing an optical wedge as the stabilized optical means is described in U.S. Pat. No. 3,378,326, and those employing reflecting means are described in U.S. Pat. No. 3,475,074 and DAS No. 1,181,540. These prior art systems may be outlined as follows. A Galilean type telescopic section (teleconverter) having an angular magnification, or an inverting telescopic section (wide-converter), stabilized optical means and a relay lens are arranged in this order from the front in an optical path thereof. As the complete system is assumed to be tilted to an angle, $\alpha$, with respect to an original line of sight axis, the incoming light enters the converter at the angle, $\alpha$, with respect to the optical axis thereof and emerges therefrom at an angle, $m\alpha$, with respect thereto. If the emerging light rays are deflected in passing through the stabilized optical means by the angle, $m\alpha$, but in the opposite direction to that of angular deviation of the complete system, the rays enter the relay lens in parallel to its axis. Accordingly, the complete system focuses the rays at the same point on the focal plane as that for which the rays were focused when the complete system was aligned with the line of sight axis.

SUMMARY OF THE INVENTION

An object of the present invention is to provide a method of, and apparatus for, image stabilization of a zoom lens system.

Another object of the present invention is to increase the overall magnification of an image-stabilized zoom lens system.

A problem with a zoom lens disposed in preceding relationship to the stabilized optical means is related to variation of angular magnification of the zoom lens as its focal length is varied when zooming. Such variation of angular magnification causes a variation in angle of emergence of the rays from the zoom lens. As a result, in stabilizing the image of the zoom lens against accidental angular deviation, it is necessary to control the stabilizing optical means in accordance with the angular magnification of the zoom lens as well as with the accidental angular deviation thereof.

Further, when an image stabilized zoom lens is designed to have an increased zoom ratio, it is necessary to simultaneously increase the angular field of view by an additional degree, or otherwise satisfactory image stabilization in the intended angular field of view would not be secured when the zoom lens is subjected to accidental displacement. However, a wide angle zoom lens which has a front member of relatively large diameter and which has an unduly elongated total length is very difficult to manage.

To overcome this drawback, the present invention contemplates the use of two zoom lens assemblies linked with each other for consecutive zooming movement in combination with stabilized optical means disposed in the optical path therebetween.

The foregoing and other objects, features and advantages of the invention will be apparent from the following detailed description of preferred embodiments thereof, as illustrated in the accompanying drawings in which:

BRIEF DESCRIPTION OF THE DRAWINGS

FIG. 3 is a schematic representation of another embodiment of the invention.

FIG. 4 is a schematic representation of still another embodiment of the invention.

DESCRIPTION OF THE PREFERRED EMBODIMENTS

Figure 1:
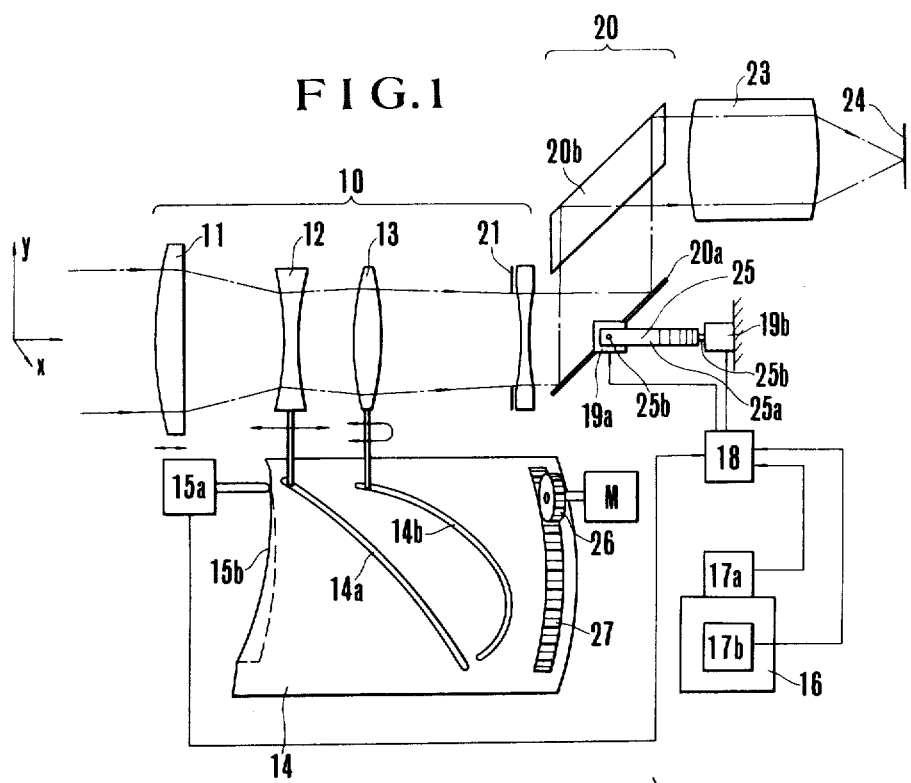
FIG. 1 is a schematic partly sectional partly elevational view of one embodiment of an image stabilization system with a zoom lens objective in accordance with the present invention.

Referring to the drawings, a zoom lens objective is illustrated as comprising an afocal front lens assembly that is generally indicated at 10 and a rear image forming lens assembly that is generally indicated at 23 through which an optical image is directed to a give portion of a focal plane 24. In FIG. 1, the front lens assembly comprises a focusing lens member 11, a variator lens member 12, a compensator lens member 13 and an erector lens member 21 optically aligned on a common axis. The erector 21 may be omitted provided that rays of light emerging from the compensator 13 are parallel. A zoom control mechanism for variator 12 and compensator 13 comprises a barrel 14 having two circumferential camming grooves 14a and 14b formed therein and shown as unfolded for the purpose of convenience, and a gear assembly 26 and 27 through which the cam barrel 14 is driven by a motor M. As barrel 14 is rotated in either direction, the variator 12 and compensator 13 are moved in differential relation to each other and as a function of the angular rotation of barrel 14, thereby the focal length of the front lens assembly 10 is varied in a manner as in the known zoom lenses. Positioned behind the front lens assembly 10 is stabilized optical means constructed, in this instance, as comprising a very light-weight movable mirror 20a and a roof-type mirror 20b secured in fixed relation to the housing with the zoom lens objective therein.

An image stabilizing mechanism for the zoom lens objective includes the aforesaid optical means 20, a first detector 15 operatively associated with the zoom control mechanism for detecting the angular magnification of the front lens assembly 10 as a function of the angular rotation of the barrel 14, and a second detector 17 co-operative with inertial means such as a gyroscope for detecting an the angular deviation of the complete objective from the original line of sight axis. The first detector is constructed as comprising a cam follower cooperating with differential transformer means 15a and a camming surface 15b on which the cam follower rides and which is formed in one end of the barrel 14, the configuration of the camming surface 15b being such that the angular magnification of the lens assembly 10 is detected by the detector 15 when zooming. The second detector 17 is composed of a first detecting means 17a for detecting components of the angular deviation of the complete objective in a horizontal plane, or x-components thereof, and a second detecting means 17b for detecting components of the angular deviation in a vertical plane, or y-components thereof, the first and second means cooperating with each other to detect vector combinations thereof. The image-stabilizing mechanism further includes a control circuit 18 responsive to the electrical signals from the first and second detectors 17a and 17b to produce a signal by which the angular position of the movable mirror 20a mounted in a gimbal mechanism is adjusted in accordance with the angular magnification of the front lens assembly and the angular deviation of the complete objective through a pair of adjusting means 19a and 19b such as rotors of electric meters, or compact motors responsive to the mirror control signal from the circuit 18. The gimbal mechanism comprises a U-shaped member 25a having an axel 25b rotatable with reference to the member 25a, the axis of which is transversal to and intersects the optical axis of the front lens assembly 10, and having a pivot 25c coaxially affixed to the bottom of the member 25a. The movable mirror 20a is fixedly mounted on the axel 25b which is rotated by the first adjusting means 19a affixed to the member 25a, being oriented as making an angle of 45° with the optical axis. The pivot 25c is rotatable by the second adjusting means 19b fixedly mounted on a portion of the housing.

Figure 2:
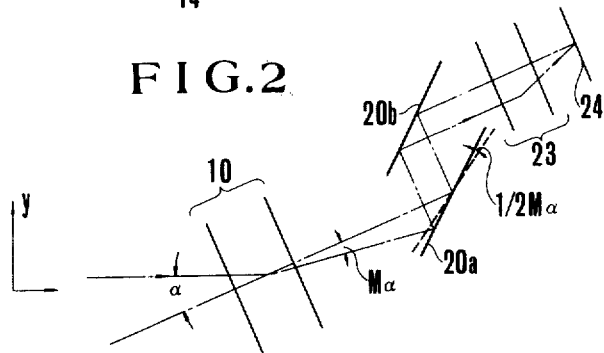
FIG. 2 is a schematic view illustrating image stabilization in the system of FIG. 1 as tilted at an angle to an original line of sight axis.

The principle of stabilizing the image of the zoom lens objective described above will be described by reference to FIG. 2, wherein the same reference characters as in FIG. 1 indicate the same parts. Now assuming that the complete objective is tilted in a vertical plane to an angle, $\alpha$, with respect to an original line of sight axis, and that the front lens assembly is adjusted to provide an angular magnification M, incoming rays of light along the original line of sight axis enter the front lens assembly 10 at the angle, $\alpha$, and emerge therefrom at an angle of M$\alpha$ with the optical axis. The emerging rays are then reflected from the mirror 20a of which the angular position is displaced by an amount from the initial angular position to the fixed mirror 20b, and therefrom directed onto the rear lens assembly 23 in parallel to the optical axis of the lens assembly 23 offset from and parallel to the optical axis of the front lens assembly. In this case, the amount of angular deviation of the mirror 20a is equal to ½ M$\alpha$, because an incident ray of light upon the plane mirror is deflected by an angle twice the angle through which the mirror 20a is displaced.

In the case of the angular deviation by an angle, $\beta$, in a horizontal plane, the mirror 20a is displaced by an angle M $\beta$, so that rays of light emerging from the front lens assembly 10 at an angle of M$\beta$ enter the mirror 20a at a right angle, thereby the rays of light emerging the stabilized optical means are directed onto the rear lens assembly in parallel to the optical axis thereof.

The operation of the embodiment shown in FIG. 1 is as follows. When the zooming motor M is operated to rotate the cam barrel 14, the variator 12 and compensator 13 are moved in differential relation to each other to vary the focal length of the front lens assembly 10. When the focal length has been adjusted to a desired value, the motor M is stopped from rotation, thereupon the first detector 15 provides an electrical signal proportional to the resultant angular magnification which is applied to the control circuit 18. So long as the objective remains aligned with a desired line of sight, the second detector 17 produces no output signal so that the first and second adjusting means 19a and 19b do not operate with the control circuit 18, although the signal from the first detector 15 is applied to the circuit 18. In this situation, the rays emerging from the erector 21 are reflected by the mirror 20a oriented to make 45° angle with the optical axis to the fixed mirror 20b, and therefrom directed to a rear lens assembly 23 by which an image is formed on the given portion of the focal plane 24. When the image-forming beam is reflected from the fixed mirror 20b, the image is inverted thereby in the horizontal direction.

In order to secure a predetermined angular field of view in a camera or telescope despite small accidental displacement thereof, it is necessary to impart into the afocal front lens assembly an angular field of view larger than the predetermined one by angle of from 2° to 3°. However, such an additional degree of compensation in the front lens assembly having a zoom ratio of as large as ten makes the complete objective heavy and bulky. It is of importance to keep the weight and bulk of the complete objective within easily manageable proportions. Consequently, in another embodiment of the present invention, the complete zoom lens objective is constructed in the form of a so-called "double zoom lens" in which the rear lens assembly is designed to include one or more lens members movable for zooming. The double zoom lens itself is known before the date of the present patent application as in Japanese Utility Model Publication No. 40-2871.

The operation of the apparatus of FIG. 3 will be described hereinbelow in connection with a zoom lens objective comprising a front lens assembly 10 having a zoom ratio of five and a rear lens assembly having a zoom ratio of two, in toatl, the zoom ratio of ten. At first, the front lens assembly is operated for zooming from one to five zoom ratios. When the complete objective is deviated from the original line of sight axis during this zooming operation, the second detector 17 produces electrical signals proportional to the vertical and horizontal components $\alpha$ and $\beta$ of the angular deviation. While the first detector 15 produces electrical signals proportional to varying angular magnifications of the front lens assembly 10, responsive to these electric signals, the control circuit 18 controls the angular position of and 19b are actuated for operation to rotate the mirror 20a through an angle of M'$\alpha$ in the vertical plane, and through an angle of M'$\beta$ in the horizontal plane. As the result, the rays emerging from the thus stabilized mirror assembly 20 are directed through the rear lens assembly to the focal plane where the image is brought into focus in the given portion regardless of the angular deviation of the complete objective from the line of sight.

When the complete objective is deviated from an original direction of alignment with the line of sight axis at an angle, $\alpha$, in the vertical plane and simultaneously at an angle, $\beta$, in the horizontal plane, the first and second detecting means 17a and 17b of the second detector produce respective electrical signals corresponding to the angular deviations which are applied to control circuit 18, thereupon the first and second adjusting means 19a and plano-concave lenses 20a and 20b disposed with their curved faces in mating rotatable relationship to each other, one of which, in this instance, the negative lens 20b is fixed to the housing in coaxial alignment with the front lens assembly 10, and another lens, i.e., the positive lens 20a which is held in the gimbal mechanism 25 so as to be pivotable about the center of curvature of the mating lenses 20a and 20b.

With a prism having a wedge angle $\theta$, generated in the mating rotatable lenses 20a and 20b, the angle of deflection of light, $\delta$, is given by:

$$\delta = (n-1)\theta$$

where $n$ is the index of refraction of the prism provided that the generated prism may be considered to be a thin prism. For the image stabilization with light rays emerging from the front lens assembly having an angular magnification M, therefore, it is necessary to adjust the amount of pivoting movement of the positive lens 20a so as to generate a prism having an wedge angle satisfying the equation $\theta = M\alpha/(n-1)$. As the optical wedge, use may be made of Dyna-lens (trademark) instead of the aforesaid compound lens.

Referring now to FIG. 3, there is shown an image stabilization system for a zoom lens objective employing a variable optical wedge as the stabilized optical means. The rear lens assembly 23 comprises a variator lens member 31, a compensator lens member 32 and a relay lens 33 arranged on a common axis in this order from the front. The variable optical wedge is arranged between the front and rear lens assemblies 10 and 23 to compensate for accidental displacement of the complete objective from the original line of sight axis, and is constructed in the form of a compound lens comprising plane-convex and the lens 20a through the first and second adjusting means 19a and 19b, thereby the lens 20a is swung through an angle of $M'\alpha/(n-1)$ in the vertical direction by the first adjusting means 19a, and through an angle of $M'\beta/(n-1)$ in the horizontal direction by the second adjusting means 19b. Therefore, the optical means functions as a prism, and the rays of light are deflected in passing through the prism to enter the rear lens assembly in parallel to its axis. Thus, the successive images are brought into focus at the same relative positions of the focal plane regardless of deviation of the complete objective from the line of sight. The consecutive zooming operations of the front and rear lens assemblies is preferably governed by a single zoom control mechanism, but the front and rear lens assemblies may be provided with respective zoom control mechanisms operable independently of each other.

In FIG. 4, there is shown still another embodiment of the invention in which a double zoom lens is used in combination with the stabilized mirror assembly of FIG. 1. The rear lens assembly 23 comprises a variator lens member 31, a compensator lens member 32 and a relay lens 33. The zoom control mechanism for the front lens assembly 10 is operatively associated with that for the rear lens assembly 23 by a suitable linkage 22 to thereby effect consecutive zooming movements of members 12, 13, 31 and 32. In the embodiments illustrated in FIGS. 1, 3 and 4, various possible combinations of negative and possitive lens members movable for zooming are suggested. It is to be understood that when a differnt combination of the power signs of the zooming members is employed, it is necessary to alter the differential relationships in which the zooming members are moved. Further, the front lens assembly may be designed to include a front zooming member acting as the compensator and a rear zooming member acting as the variator, or to include front and rear zooming members, each of which acts as either of the variator and compensator dependent upon the parts of the zooming range.

The features which may be considered as characteristics of the present invention are:

1. Because of the arrangement of the lens assembly of variable focal length in preceding relationship to the stabilizing optical means, the accommodation for a variation in the otherwise fixed parameter of angular magnification is made in the image stabilizing mechanism for controlling the optical means.

The above-described embodiments of the present invention are illustrated as employing a combination of a cam assembly with a differential transformer (an electric micrometer) for detecting the varying angular magnifications. Instead of the differential transformer, it is possible to use a rheostat or an angular detection encoder. If all of the detecting and adjusting operations are performed by use of mechanical devices, the sum of the frictional forces will amount to much. Therefore, such mechanical devices are preferably replaced by electrical devices of the non-contact type, or of the fluid type.

2. In order to facilitate the increase of the variable focal length range while preserving a sufficient space in which the image is to be stabilized, the zoom lens objective is constructed in the form of a double zoom lens to locate the stabilized optical means between the front and rear zooming lens assemblies thereof.

In the above described embodiments, as the lens assembly of variable forcal length, mention is made of a lens assembly of the zoom type. However, it is possible to use the so-called "vari-focal type" lens assembly having a single movable lens as described in British Patent No. 1,067,428.

What is claimed is:

1. A zoom lens system with stabilized optical means comprising:

an image forming rear lens assembly;

an afocal front lens assembly which includes the members movable for zooming behind a front member which remains stationary during zooming, said front member being movable to effect focusing to suit different object positions, and the light rays emerging from said front lens assembly being almost parallel;

an image stabilizing mechanism which includes a stabilizing optical means arranged in the optical path between said front and rear lens assemblies;

a first detector responsive to the movement of said zooming members for detecting the angular magnification of said front lens assembly;

a second detector cooperating with inertial means for detecting the deviation angle of the complete system from a line of sight; and adjusting means connected to said first and second detectors for adjusting the angular position of said stabilizing optical means in accordance with the detected angular magnification and with the detected angular deviation, whereby the light bundle emerging from said stabilized optical means is directed upon said rear lens assembly parallel to the optical axis thereof irrespective of the angular deviation of the complete objective from the line of sight.

2. A zoom lens system according to claim 1, in which said afocal front lens assembly includes a plurality of differentially movable lens members for zooming behind the focusing front member, and said rear lens assembly includes at least two movable lens members in front of a relay lens.

3. A zoom lens system according to claim 2, in which said stabilized optical means comprises a swingable reflecting means and fixed reflecting means, and the angular position of said swingable reflecting means is adjusted by said adjusting means.

4. A zoom lens system according to claim 2, in which said stabilized optical means comprises plano-convex and plano-concave lenses disposed with curved surfaces in mating rotatable relation to each other, one of which is swingable about the center of curvature of the mating lenses, and the angular position of said swingable lens is adjusted by said adjusting means.

5. A zoom lens system according to claim 2, in which said rear lens assembly includes a plurality of differentially movable lens members for zooming in front of a relay lens, wherein, after the movement of the movable lens of the front lens assembly has been completed, the movement of the movable lens members of the rear lens assembly begins, and said inertial means is a gyroscope arranged in the housing of the zoom lens system for detecting vertical and horizontal components of said angular deviation, whereby the angular position of said stabilizing optical means is adjusted in accordance with the angular magnification of said front lens assembly and with the vertical and horizontal components of said angular deviation.

6. A zoom lens system according to claim 2, in which a movable lens member on the object side in the movable lens members of said rear lens assembly has a negative reflective power and a movable lens member on the image side has a positive reflective power.

7. A zoom lens system according to claim 2, in which a movable lens member of said rear lens assembly has a negative reflective power.

* * * * *